(12) United States Patent
Erceg et al.

(10) Patent No.: US 7,154,959 B2
(45) Date of Patent: Dec. 26, 2006

(54) SYSTEM AND METHOD FOR EMULATING A MULTIPLE INPUT, MULTIPLE OUTPUT TRANSMISSION CHANNEL

(75) Inventors: Vinko Erceg, San Jose, CA (US);
Daniel Baum, San Jose, CA (US);
Arogyaswami J. Paulraj, Stanford, CA (US); Victor Shtrom, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1374 days.

(21) Appl. No.: 09/942,838

(22) Filed: Aug. 29, 2001

(65) Prior Publication Data

US 2003/0050020 A1    Mar. 13, 2003

(51) Int. Cl.
*H04L 5/12* (2006.01)
(52) U.S. Cl. .................. 375/267; 375/300; 455/108
(58) Field of Classification Search .................. None
See application file for complete search history.

(56) References Cited

U.S. PATENT DOCUMENTS

| 6,236,363 B1 | 5/2001 | Robbins et al. |
| 2004/0184559 A1* | 9/2004 | Ballantyne .................. 375/300 |

* cited by examiner

Primary Examiner—Creighton Smith

(74) *Attorney, Agent, or Firm*—Michael A. Proksch

(57) ABSTRACT

The invention includes a MIMO channel emulator that includes a channel emulator matrix. The channel emulator matrix receives N inputs and generating M outputs. The channel emulator matrix includes a plurality of splitters. Each splitter receives at least one of the N inputs, and each splitter generates a plurality of signal paths. The channel emulator matrix further includes at least one phase shifter. Each phase shifter adjustably shifts a phase of at least one signal path. The channel emulator matrix further includes a plurality of combiners. Each combiner receives more than one of the plurality of signal paths. At least one of the combiners receives a phase adjusted signal path, and each combiner generates at least one of the M outputs. The invention can also include a plurality of fading emulators. Each fading emulator receives at least one emulator input. The plurality of emulators generate the N splitter inputs. The fading emulators can include fading delay lines. The fading emulators can be adjusted so that each of the M outputs are not fully correlated with each of the other M outputs. The invention can also include a plurality of second splitters. Each second splitter receives at least one channel input signal. Each second splitter generates a plurality of second signal. This embodiment further includes at least one second phase shifter. Each second phase shifter adjustably shifts a phase of at least one second signal. This embodiment further includes a plurality of second combiners. Each second combiner receives more than one of the plurality of second signal paths. At least one second combiner receives a phase adjusted second signal path. Each second combiner generates at least one of the fading emulator inputs.

21 Claims, 7 Drawing Sheets

SYSTEM AND METHOD FOR EMULATING A MULTIPLE INPUT, MULTIPLE OUTPUT TRANSMISSION CHANNEL

FIELD OF THE INVENTION

The invention relates generally to wireless communications channel emulation. More particularly, the invention relates to a system and method for emulating a multiple input, multiple output wireless transmission channel.

BACKGROUND OF THE INVENTION

Wireless communication systems commonly include information carrying modulated carrier signals that are wirelessly transmitted from a transmission source (for example, a base transceiver station) to one or more receivers (for example, subscriber units) within an area or region.

A form of wireless communication includes multiple transmit antennae and multiple receiver antennae. Multiple antennae communication systems can support communication diversity and spatial multiplexing.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. For example, if three antennae are used at the transmitter (base transceiver station) and the receiver (subscriber unit), the stream of possibly coded information symbols is split into three independent substreams. These substreams occupy the same channel of a multiple access protocol. Possible same channel multiple access protocols include a same time slot in a time-division multiple access protocol, a same frequency slot in frequency-division multiple access protocol, a same code sequence in code-division multiple access protocol or a same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the receiver array, a spatial signature of each of the received signals is estimated. Based on the spatial signatures, a signal processing technique is applied to separate the signals, recovering the original substreams.

FIG. 1 shows three transmitter antenna arrays 110, 120, 130 that transmit data symbols to a receiver antenna array 140. Each transmitter antenna array and receiver antenna area includes spatially separate antennae. A receiver connected to the receiver antenna array 140 separates the received signals.

FIG. 2 shows modulated carrier signals traveling from a transmitter 210 to a receiver 220 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Communication Diversity

Antenna diversity is a technique used in multiple antenna-based communication system to reduce the effects of multi-path fading. Antenna diversity can be obtained by providing a transmitter and/or a receiver with two or more antennae. These multiple antennae imply multiple channels that suffer from fading in a not fully correlated manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

An individual transmission link exists between each individual base transceiver station antenna and each receiver antennae of a subscriber unit in communication with the base transceiver station. The previously described spatial multiplexing and communication diversity require multiple antennas to each have transmission links with generally more than one receiver antennae. The development of systems that provide spatial multiplexing and communication diversity requires characterizing of the systems through multi-channel emulations. The multi-channel emulations should be able to emulate channel delay spread, channel fading, doppler spread, co-channel interference, cross-polarization discrimination and average white gaussian (AWG) noise.

It is desirable to have an system and method that provides emulation of multiple transmission channel (MIMO) systems. It is desirable that the systems be able to emulate channel characteristics such as delay spread, channel fading, Doppler spread, co-channel interference, cross-polarization discrimination and average white gaussian (AWG) noise. Additionally, it is desirable that the system be inexpensive to build

SUMMARY OF THE INVENTION

As shown in the drawings for purposes of illustration, the invention is embodied in a system and a method for emulating multiple input, multiple output (MIMO) channels. The emulation includes modeling of delay spread, channel fading, doppler spread, co-channel interference, cross-polarization discrimination and average white gaussian (AWG) noise.

A first embodiment of the invention includes a MIMO channel emulator that includes a channel emulator matrix. The channel emulator matrix receives N inputs and generating M outputs. The channel emulator matrix includes a plurality of splitters. Each splitter receives at least one of the N inputs, and each splitter generates a plurality of signal paths. The channel emulator matrix further includes at least one phase shifter. Each phase shifter adjustably shifts a phase of signals traveling at least one signal path. The channel emulator matrix further includes a plurality of combiners. Each combiner receives more than one of the plurality of signal paths. At least one of the combiners receives a phase adjusted signal path, and each combiner generates at least one of the M outputs.

A second embodiment of the invention is similar to the first embodiment. The second embodiment further includes the at least one phase shifter being adjusted to emulate an angle of arrival or angle of departure of at least one of the signal paths. The phase shifter can be manually or electronically controlled.

A third embodiment is similar to the first embodiment. The third embodiment includes a plurality of fading emulators. Each fading emulator receives at least one emulator input. The plurality of emulators generate the N splitter inputs. The fading emulators can include fading delay lines. The fading emulators can be adjusted so that each of the M outputs are not fully correlated with each of the other M outputs. Alternatively, the at least one phase shifter can be adjusted to emulate a correlation between the multi-representative signals.

A fourth embodiment is similar to the third embodiment. The fourth embodiment includes a plurality of second splitters. Each second splitter receives at least one channel input signal. Each second splitter generates a plurality of second signal. This embodiment further includes at least one second phase shifter. Each second phase shifter adjustably shifts a phase of at least one second signal. This embodiment further includes a plurality of second combiners. Each second combiner receives more than one of the plurality of second signal paths. At least one second combiner receives a phase adjusted second signal path. Each second combiner generates at least one of the fading emulator inputs.

A fifth embodiment is similar to the first embodiment. The fifth embodiment includes a co-channel interference mixing matrix. The co-channel mixing matrix generates a plurality of interference outputs, and at least one of the combiners receives at least one of the interference outputs.

A sixth embodiment is similar to the first embodiment. The sixth embodiment includes a noise generator. The noise generator generates at least one noise output, and at least one of the combiners receives at least one noise output.

A seventh embodiment includes a MIMO channel emulator. The MIMO channel emulator includes a channel emulator mixing matrix. The channel emulator mixing matrix receiving N inputs and generating M outputs. The channel emulator mixing matrix includes a plurality of splitters, each splitter receiving at least one of the N inputs, each splitter generating a plurality of signal paths. At least one attenuator adjustably attenuates an amplitude of signals traveling at least one signal path. A plurality of combiners receive more than one of the plurality of signal paths. At least one combiner receives an amplitude adjusted signal path, each combiner generating at least one of the M outputs.

Other aspects and advantages of the present invention will become apparent from the following detailed description, taken in conjunction with the accompanying drawings, illustrating by way of example the principles of the invention.

DETAILED DESCRIPTION

Figure 1:
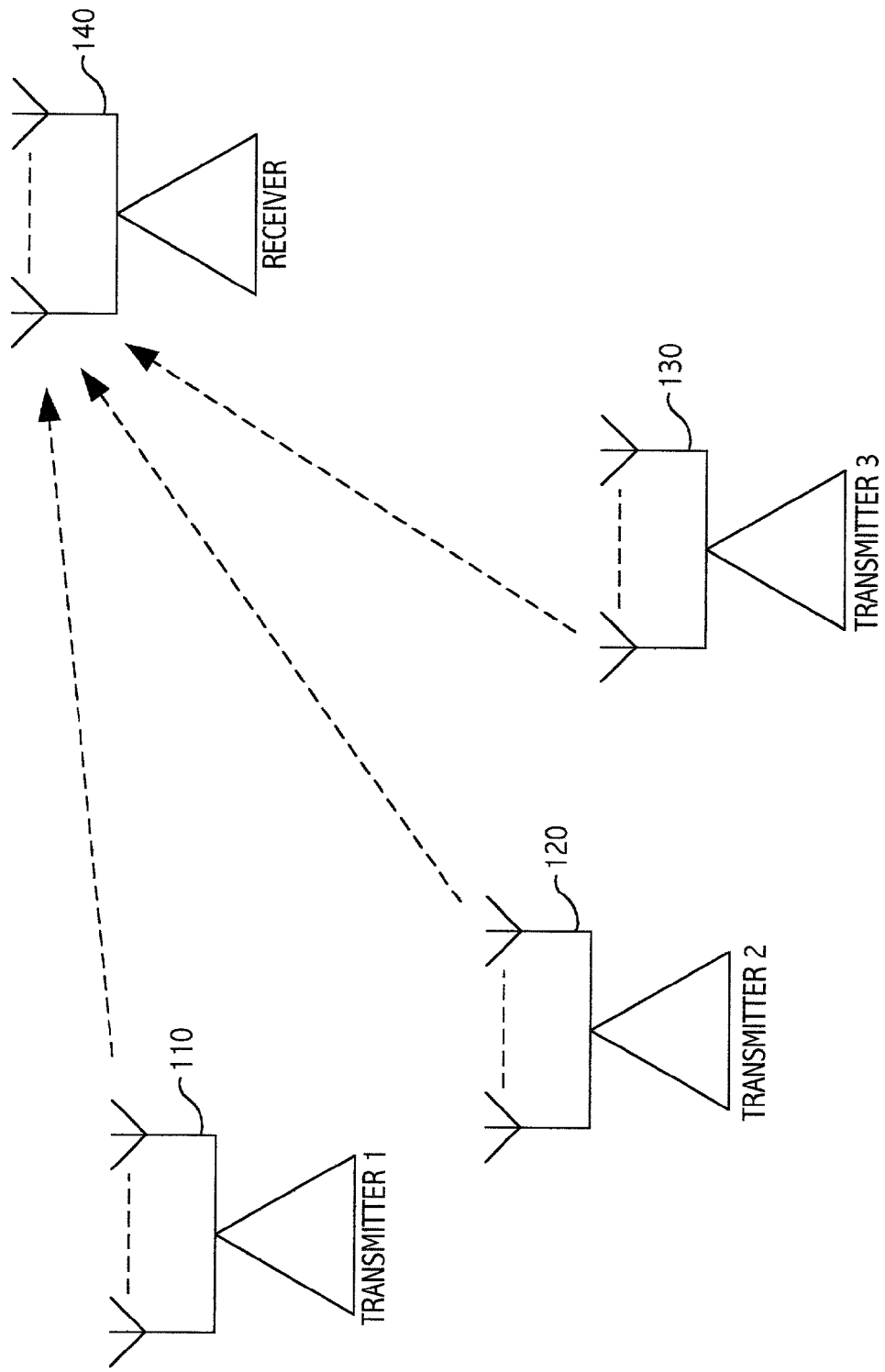
FIG. 1 shows a prior art wireless system that includes spatially separate transmitter antennae and spatially separate receiver antennae.
Figure 2:
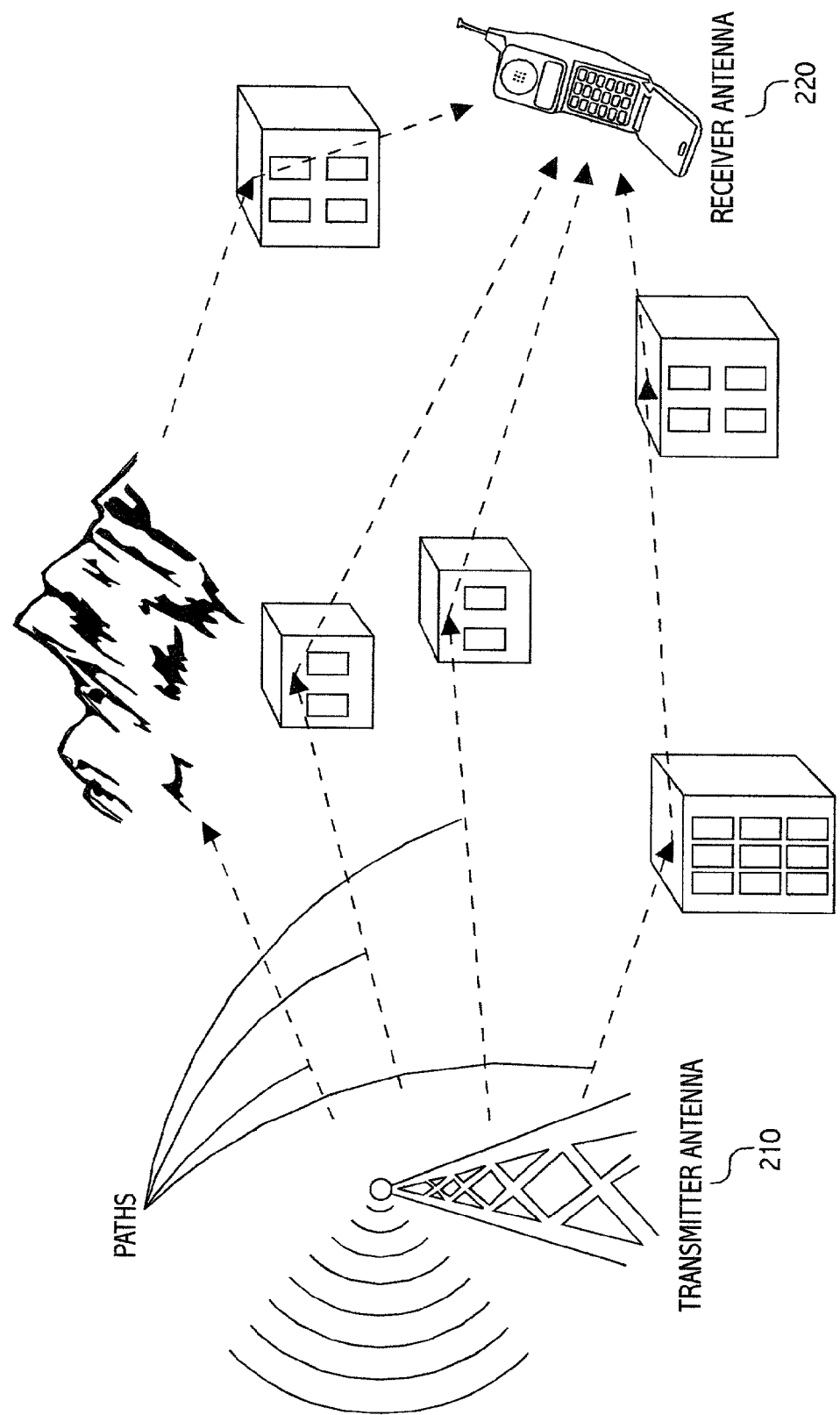
FIG. 2 shows a prior art wireless system that includes multiple paths from a system transmitter to a system receiver.

As shown in the drawings for purposes of illustration, the invention is embodied in a system and a method for emulating multiple input, multiple output (MIMO) channels. The emulation includes modeling of delay spread, channel fading, Doppler spread, co-channel interference, cross-polarization discrimination and average white gaussian (AWG) noise.

Figure 3:
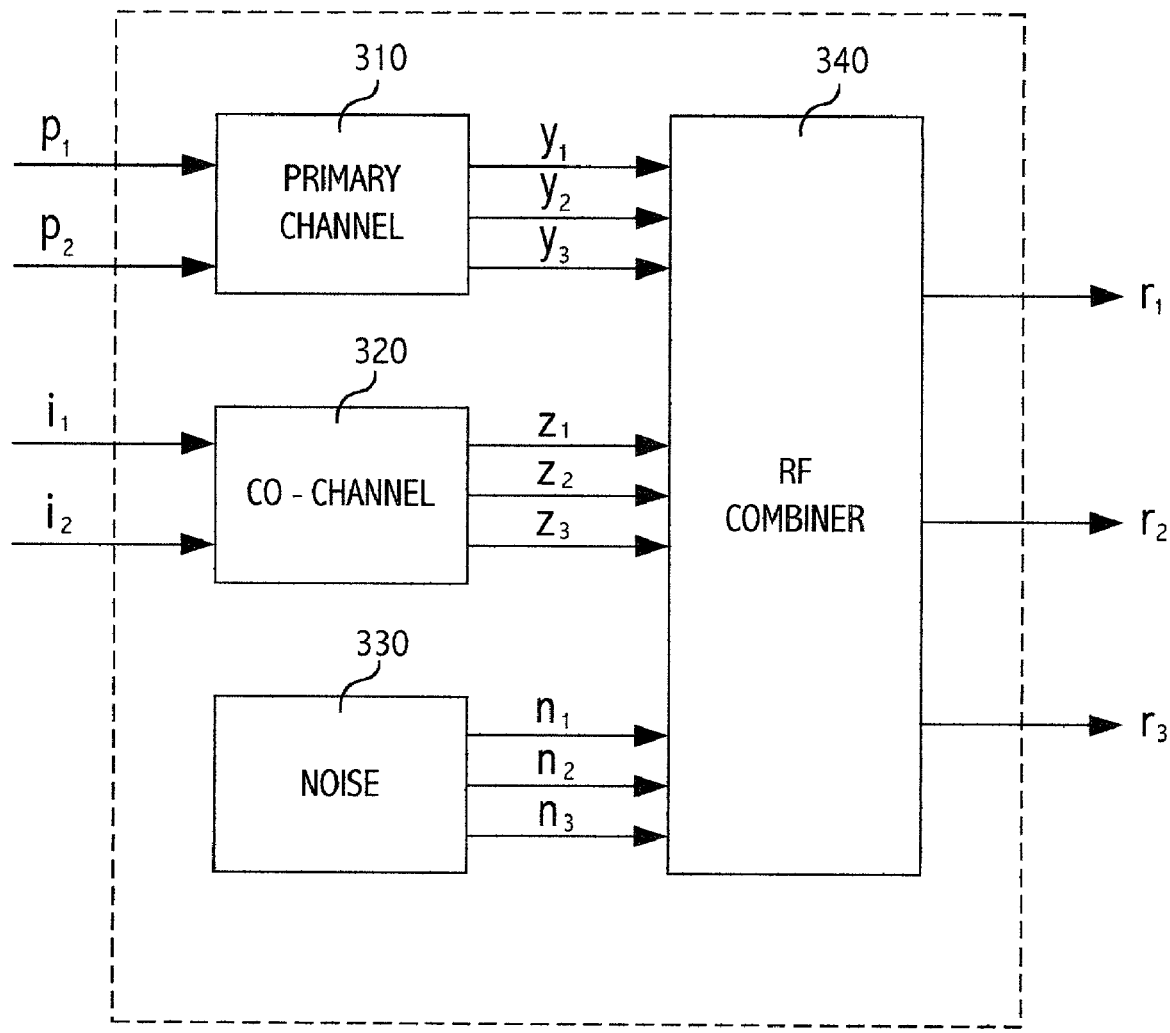
FIG. 3 shows an embodiment that includes the invention.

FIG. 3 shows an embodiment that can include the invention. This embodiment includes a general multiple input (two), multiple output (three) (MIMO) channel emulator. Generally, such a emulator represents a MIMO channel that includes two transmit antennae and three receive antennae. The emulator can easily be modified to emulate more or less transmit antennae or receiver antennae.

The channel emulator includes two inputs p1 and p2 that represent signals transmitted from a first antenna and a second antenna. The channel emulator also includes two inputs i1 and i2 that represent signals transmitted from interfering antennae. The interfering signals generally represent signals transmitted from neighboring transmitters in a cellular wireless system.

A primary channel 310 generates three outputs y1, y2, y3 that represent channel signals received by the three receiver antennae. A co-channel 320 generates three outputs z1, z2, z3 that represent the co-channel signals received by the three receiver antennae. A noise source 330 generates three outputs n1, n2, n3 that represent AWG (average white gaussian) noise received by the three receiver antennae.

A combiner 340 receives the three channel signals y1, y2, y3, the three co-channel outputs z1, z2, z3 and the three noise source outputs n1, n2, n3. The combiner combines the all of the received signals and generates three outputs r1, r2, r3 that represent the combined received signals.

The channel elements emulated by the embodiment of FIG. 3 include fading, co-channel interference, additive noise and cross-polarization discrimination.

The description provided here is application to both up-link transmission channels and down-link transmission channels.

The system of FIG. 3 can be used for evaluating the performance of MIMO channels. The MIMO channel emulations are applicable to both spatial multiplexing and communication diversity systems.

For each channel block (primary channel 310 and co-channel 320) of the MIMO system, every transmit/receive antenna combination can be emulated as an independent fading sub-channel. Each independent fading channel can be emulated as an independent fading single input, single output (SISO) channel. Therefore, a 2 by 3 system as depicted in FIG. 3 that includes co-channel interference can be modeled, with $2 \times (2 \times 3) = 12$ independent fading SISO channels per link.

A straightforward configuration of an emulation model for the above described 12 independent fading SISO channels can include a channel emulator model. A channel emulator model is generally implemented with channel emulator units. The number of channel emulator units required is dependent upon the number of independent fading SISO channels to be emulated. Emulation of the 12 independent fading SISO frequency selective channels requires 12 channel emulators. A commercially available channel emulator unit includes a "TAS 4500 Flex 5" channel emulator unit. The TAS 4500 Flex 5 unit provides accurate repeatable control over RF channel characteristics such as multi-path fading, delay spread, path loss and log normal shadowing. This particular channel emulator unit (TAS 4500 Flex 5) includes emulation of two SISO frequency selective channels. This emulator provides 3 taps (optional 6 taps) per channel with arbitrary delay, power, K-factor and Doppler spectrum on each tap. A tap consists of fading paths having different delays.

Channel emulator units like the TAS 4500 Flex 5 channel emulator unit are expensive. Implementation of the above described 12 independent fading SISO frequency selective channels requires 12/2=6 TAS units.

An actual MIMO radio channel usually does not demonstrate fully independent fade behavior between channels as can be emulated by using separate TAS channels for each transmit/receive antenna combination. Instead, the individual sub-channels of actual MIMO channels are correlated with each other. Observance of this behavior of actual MIMO channels allows implementation of an emulator of the MIMO channels to include fewer TAS channel emulators without jeopardizing the realism of the emulator.

With this realization in mind, a method and system for emulating MIMO channels will be described that uses input and output matrices in combination with commercially available channel emulators. The specific embodiment described includes three TAS emulator channel units along with the input and output mixing matrices to emulate the above described 12 independent fading SISO frequency selective channels. The emulator provides for the adjustment of emulation of the correlation between antenna elements and the emulation of XPD. It is to be understood that the embodiments described are provided as examples. The number of channel emulators is not limited to the number described and shown. Additionally, the input and output matrix configurations can be varied.

The Primary Channel

Figure 4:
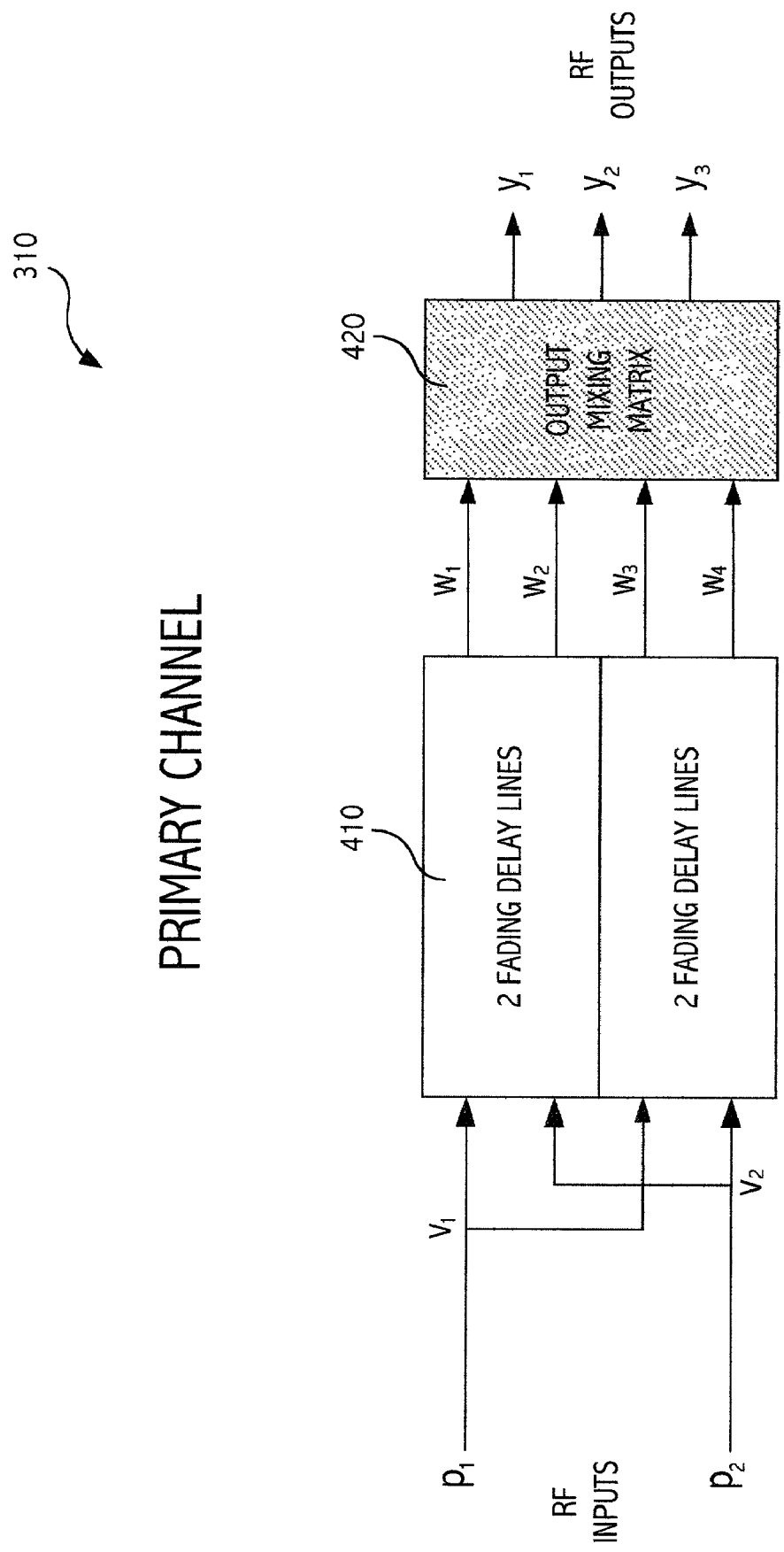
FIG. 4 shows an embodiment of the invention.

FIG. 4 shows an embodiment of the invention. This embodiment includes a configuration of the primary channel 310 of FIG. 3. This configuration of the primary channel 310 includes a fading channel emulator 410 and an output mixing matrix 420. Fading channel emulators are well known in the art of communication systems.

The output mixing matrix 420 connects outputs of the fading channel emulator 410 through splitters, attenuators, phase shifters and combines to the MIMO channel emulator output. The output mixing matrix 420 is configured to allow adjustment of correlations between emulated receive antenna signals. Additionally, the output mixing matrix 420 can emulate the cross-polarization discrimination between transmit and receive antennae.

The Output Mixing Matix

Figure 5:
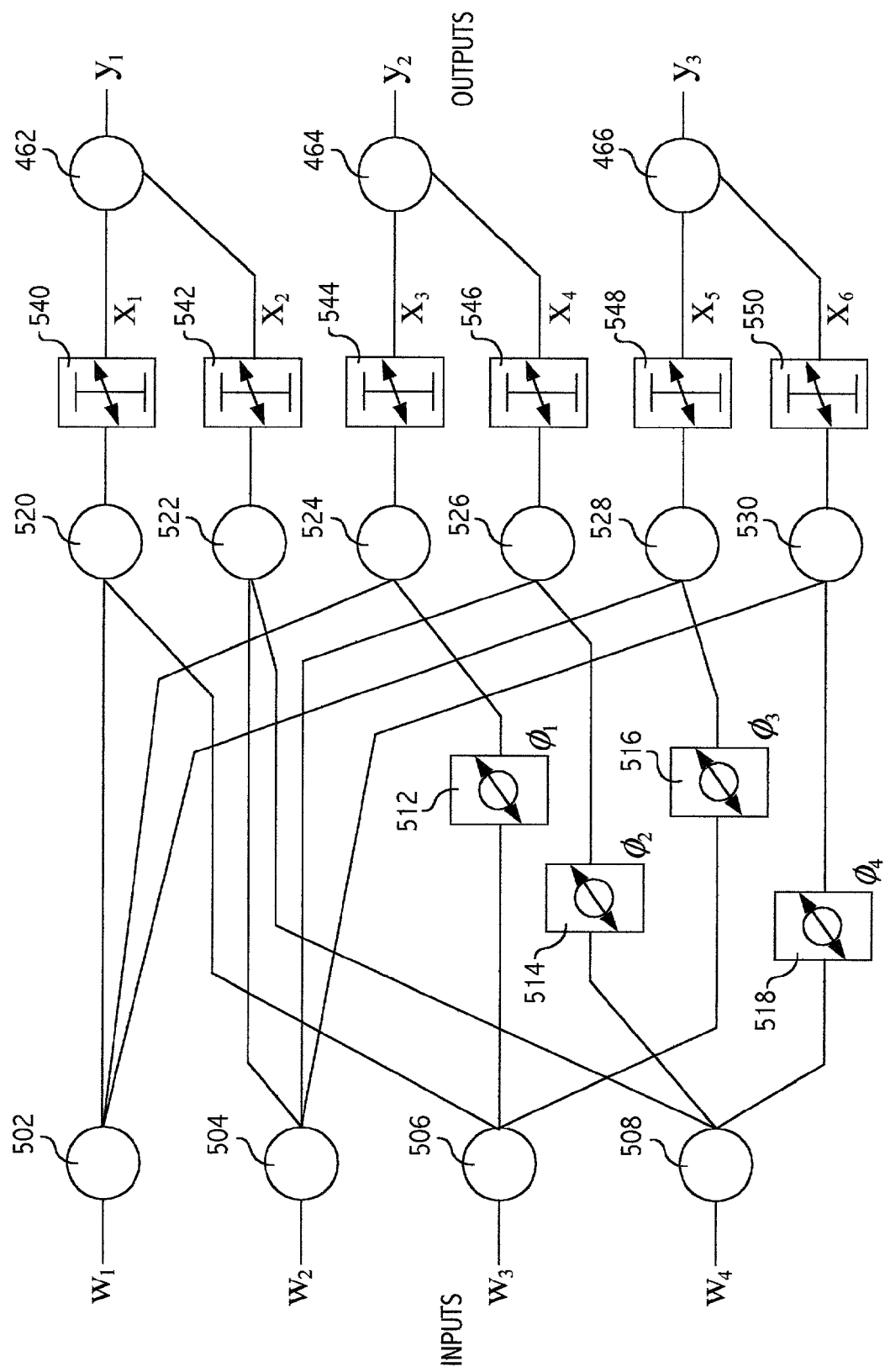
FIG. 5 show an embodiment of an output mixing matrix according to the invention.

FIG. 5 shows an embodiment of the output mixing matrix 420 of FIG. 4. The channel emulators 410 of FIG. 4 include four outputs w1, w2, w3, w4. The output mixing matrix 420 includes four splitters 502, 504, 506, 508 that receive each of the four outputs w1, w2, w3, w4 of the channel emulators 310. The splitters 502, 504, 506, 508 generate multiple splitter outputs that represent many possible multi-path signals. Splitters are well know in the art of communication systems.

The output matrix of FIG. 5 has three outputs. Therefore, the splitters 502, 504, 506, 508 each include three outputs. In general, the matrices include a maximum number of N×M paths, in which each path can include a phase shifter and an attenuator. It is possible to reduce the number of components (splitters, attenuators, phase shifters, combiners) included while still being able to adjust the correlation and XPD.

In FIG. 5, four of the input signals are passed through phase shifters 512, 514, 516, 518. The phase shifters 512, 514, 516, 518 adjustably shift the phase of the signals that pass through the phase shifters 512, 514, 516, 518. The phase shifters can be manually or electronically adjustable. Both manual and electronic phase shifters are well known in the art of communication systems. As previously mentioned, the number of phase shifters included can be varied depending upon the desired emulation. Implementations of the phase shifters can include commercially available phase shifters, or the phase shifters can be as simple as pre-calculated delay lines.

A series of combiners 520, 522, 524, 526, 528, 530 receive the multi-path emulated signals (both phase shifted and non-phase shifted). In FIG. 5, each combiner 520, 522, 524, 526, 528, 530 receives two signals. Clearly, each combiner can receive more than two signals. Combiners are well known in the art of communication systems.

The combiners 520, 522, 524, 526, 528, 530 combine the received signals, and generate several combined outputs. In FIG. 5, the combined outputs are passed through attenuators 540, 542, 544, 546, 548, 550. The attenuators 540, 542, 544, 546, 548, 550 adjustably attenuate the combined outputs. The attenuators 540, 542, 544, 546, 548, 550 can be manually or electronically adjustable. Both manual and electronic attenuators are well known in the art of communication systems.

The attenuators 540, 542, 544, 546, 548, 550 provide attenuation of the combined multi-path signals to emulate cross-polarization discrimination between the transmitters and the receivers, and to emulate attenuation during transmission of the multi-path signals.

A set of output combiners 562, 564, 566 receive the attenuated signals and generate three MIMO channel output emulated signals. As previously stated, combiners are well known in the art of communication systems.

It is to be understood that FIG. 5 is merely an example of an embodiment of the invention. Each of the signal paths between the splitters 502, 504, 506, 508 and the combiners 520, 522, 524, 526, 528, 530 can include phase shifters and attenuators in all possible combinations. Additionally, each of the signal paths between the combiners 520, 522, 524, 526, 528, 530 and output combiners 562, 564, 566 can include phase shifters and attenuators in all possible combinations.

Figure 6:
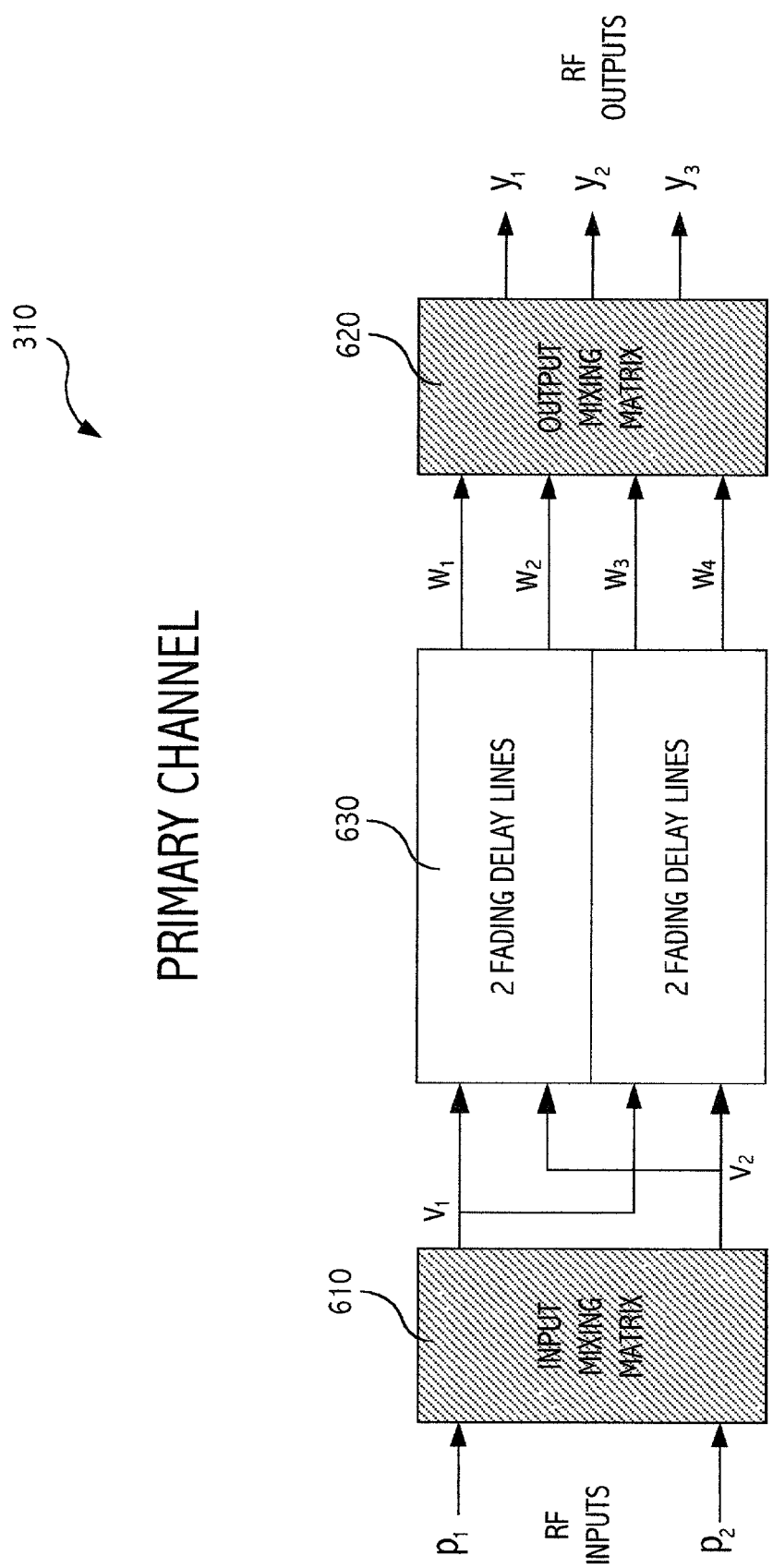
FIG. 6 shows another embodiment of the invention.

FIG. 6 show an embodiment of the invention that includes an input mixing matrix 610 and an output matrix 620 in which the input mixing matrix 610 and the output mixing matrix 620 are separated by channel emulators 630. The input mixing matrix 620 provides for additional adjustment of transmit correlation through adjustment phase shifters within the input mixing matrix 620.

Figure 7:
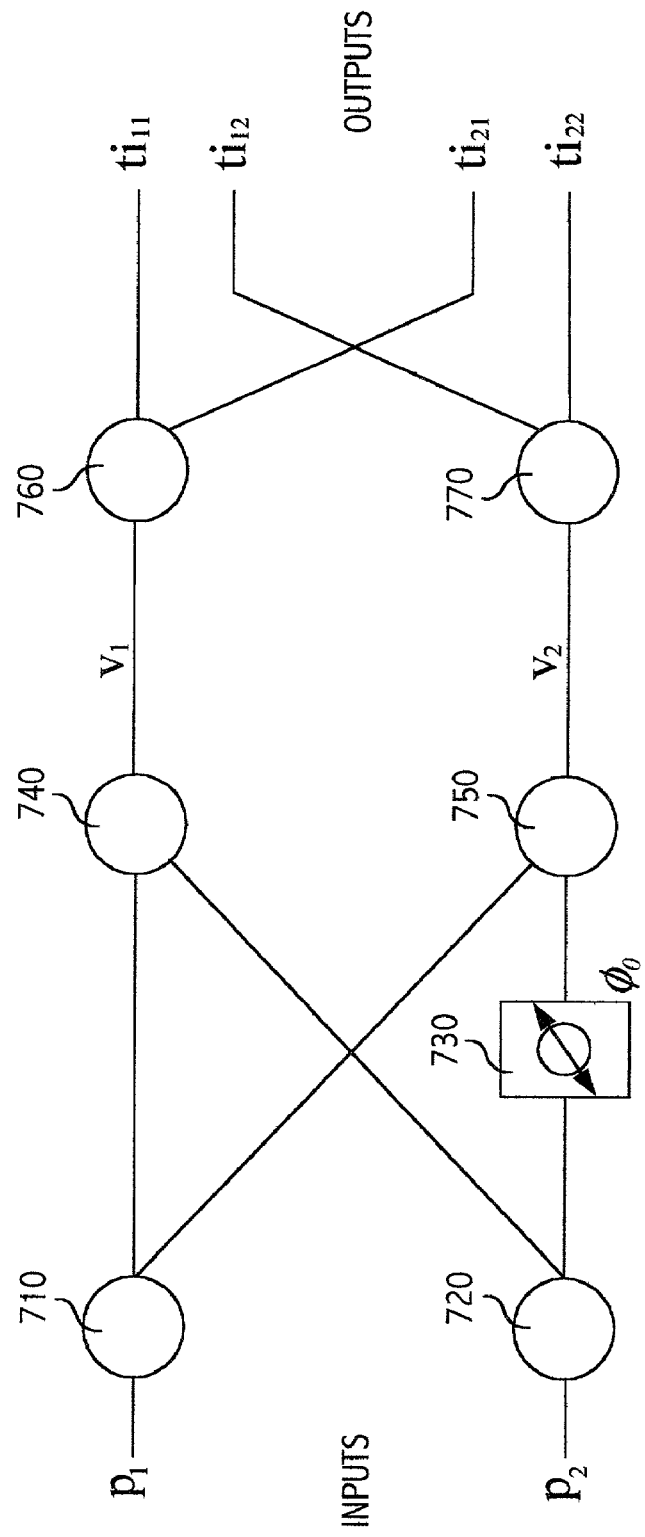
FIG. 7 shows an embodiment of an input mixing matrix according to the invention.

FIG. 7 shows an embodiment of the input mixing matrix 610 of FIG. 6. This embodiment includes splitters 710, 720. As described before, the splitters 710, 720 generate signals. A phase shifter 730 phase shifts one of the signals. Combiners 740, 750 combine both the phase shifted signals, and the non-phase shifted signals. Splitters 760, 770 re-split the combine signals generating multiple signals for the 2-channel emulators 630.

The Channel Matrix

In a MIMO (multiple input, multiple output) system, a channel transfer function, that represents the input/output relationship of the channel, can be designated with a matrix H.

Assuming no significant multipath delay spread and therefore no intersymbol interference, the input-output relationship of the communications channel at symbol time k can be represented by:

$$r(k) = H \cdot s(k) + n(k)$$

where H is a channel matrix that represents the transmission channel, and n(k) represent additive noise. The dimensions of the channel matrix H are dependent upon the number of transmitter antennae and the number of receiver antennae. Assuming N symbols are transmitted from N antennas, a transmit symbol vector can be represented by:

$$s(k) = [s_1(k), s_2(k), \ldots, s_N(k)]^T,$$

where $s_i(k)$ is the data symbol being transmitted from the $i^{th}$ transmit antenna.

Assuming M receive antennae receive the transmitted signals, a vector representation of the received symbols is:

$$r(k) = [y_1(k), y_2(k), \ldots, y_M(k)]^T,$$

where $y_j(k)$ is the data symbol being received by the $j^{th}$ receiver antenna.

Therefore, with N transmitter antennae and M receiver antennae, H (at a given symbol time) is represented by:

$$H = \begin{bmatrix} h_{11} & h_{12} & \cdots & h_{1N} \\ h_{21} & \vdots & & \vdots \\ \vdots & \cdots & h_{ij} & \vdots \\ h_{M1} & \cdots & \cdots & h_{MN} \end{bmatrix},$$

where $h_{ij}$ is a complex number that represents the sub-channel between transmitter antenna j and receiver antenna i.

Antenna Correlation

Correlation between different sub-channels is an important property of the MIMO-channel that must be considered by any communication system and hence every emulation system.

Antenna correlation is usually defined as the envelope correlation coefficient between signals received by two antenna elements from one transmitter. An envelope correlation coefficient is a real-valued number that represents the correlation between the two received signals and hence the correlation between the respective channels.

Generally, the envelope correlation coefficient between two zero-mean random variables $X_0 = X - E\{X\}$ and $Y_0 = Y - E\{Y\}$, is defined as:

Envelope correlation coefficient $$\rho_{XY} = |\rho_{XY}| = \frac{|E\{XY^*\}|}{\sqrt{E\{|X|^2\}}\sqrt{E\{|Y|^2\}}}$$

A fundamental element of a channel emulator is the ability to set transmit and receive correlations of the channel to be emulated. The receive antennae correlations are given by the correlation between any two elements of the matrix taken from the same column. That is, the receive correlation $\rho_{Rij/k}$ is the envelope correlation coefficient between $h_{jk}$ and $h_{ik}$ for any $k = 1 \ldots N$. Similarly, the transmit antenna correlations are given by the correlation between any two elements of the matrix taken from the same row. That is, the transmit antenna correlation $\rho_{Tij/k}$ is the correlation coefficient between $h_{ki}$ and $h_{kj}$ for any $k = 1 \ldots M$.

Cross-Polarization-Discrimination (XPD)

Cross-Polarization-Discrimination (XPD) is a property of the MIMO channel that is caused by the differences in antennae polarization. The differences in antennae polarization results in different sub-channels experiencing different mean attenuation. XPD is the ratio of mean power between two channels. For example, the XPD can be represented by;

$$X = \frac{E\{|h_1|^2\}}{E\{|h_2|^2\}}.$$

Example Calculations of the Disclosed Embodiments

The channel transfer function of the embodiment shown in FIG. 4 with the output mixing matrix as shown in FIG. 5 can be represented by:

$$H = \frac{1}{2} \begin{bmatrix} X_1 g_1 + X_1 g_3 & X_2 g_2 + X_2 g_4 \\ X_3 g_1 + X_3 g_3 \exp(j\Phi_1) & X_4 g_2 + X_4 g_4 \exp(j\Phi_2) \\ X_5 g_1 + X_5 g_3 \exp(j\Phi_3) & X_6 g_2 + X_6 g_4 \exp(j\Phi_4) \end{bmatrix}$$

where $g_1, g_2, g_3, g_4$ are the transfer functions of the 4 fading channel emulators 430.

The following expressions for the envelope correlation coefficients can be derived based on the assumption that the coefficients $g_1$ and $g_2$, and $g_3$ and $g_4$ are correlated by $\rho_{g_1 g_2}$ and $\rho_{g_3 g_4}$, and all other coefficients (g1/g3, g2/g4, g1/g4, g2/g3) are statistically independent (that is $E\{\hat{g}_i \hat{g}_j^*\} = 0$, with $\hat{g} = g - E\{g\}$, and all coefficients normalized (that is, $E\{g_i g_i^*\} = 1$).

$$\rho_{R12/1} = \frac{1}{2} |1 + \exp(-j\Phi_1)|$$

$$\rho_{R12/2} = \frac{1}{2} |1 + \exp(-j\Phi_2)|$$

$$\rho_{R13/1} = \frac{1}{2} |1 + \exp(-j\Phi_3)|$$

$$\rho_{R13/2} = \frac{1}{2} |1 + \exp(-j\Phi_4)|$$

$$\rho_{R23/1} = \frac{1}{2} |1 + \exp(j\Phi_1 - j\Phi_3)|$$

$$\rho_{R23/2} = \frac{1}{2} |1 + \exp(j\Phi_2 - j\Phi_4)|$$

$$\rho_{T12/1} = \frac{1}{2} |\rho_{g_1 g_2} + \rho_{g_3 g_4}|$$

$$\rho_{T12/2} = \frac{1}{2} |\rho_{g_1 g_2} + \rho_{g_3 g_4} \exp(j\Phi_1 - j\Phi_2)|$$

$$\rho_{T12/3} = \frac{1}{2} |\rho_{g_1 g_2} + \rho_{g_3 g_4} \exp(j\Phi_3 - j\Phi_4)|$$

The above expression shows that in this configuration receive correlations can be set by adjusting phases in the matrix, while transmit correlations can be set by correlating pairs of fading channels.

For example, for a desired correlation of 0.5, phase values of 120 for $\Phi_1$ and $\Phi_2$, and –120 for $\Phi_3$ and $\Phi_4$ will yield the correct result. Note that the phases are independent of carrier frequency or bandwidth.

Independently of the correlations, the XPD values can be set. In this configuration all mean sub-channel powers can be adjusted individually:

$$E\{|H|^2\} = \begin{bmatrix} X_1 & X_2 \\ X_3 & X_4 \\ X_5 & X_6 \end{bmatrix}.$$

Verification of Frequency Selective Channels

In the case of frequency-selective channels, the fading channels are represented by channel emulators instead of by single coefficients. Therefore the $g_i$ coefficients in the above calculations must be replaced by the complete impulse responses. That is, $$g_i(t, \tau) = \sum_l g_{il}(t)\delta(\tau - \tau_1)$$

If all coefficients are statistically independent, then $$E\{\hat{g}_{il}(t)\hat{g}_{jm}^*(t)\} = \sigma_{il}^2 \delta_{ij} \delta_{lm}, \text{ with } \hat{g}(t) = g(t) - E\{g(t)\},$$

and it is easily deducted that all correlations remain exactly the same as before.

Although specific embodiments of the invention have been described and illustrated, the invention is not to be limited to the specific forms or arrangements of parts so described and illustrated. The invention is limited only by the claims.

What is claimed:

1. A MIMO channel emulator comprising a channel emulator mixing matrix, the channel emulator mixing matrix receiving N inputs and generating M outputs, the channel emulator mixing matrix comprising:
   a plurality of splitters, each splitter receiving at least one of the N inputs, each splitter generating a plurality of signal paths;
   at least one phase shifter, each phase shifter adjustably shifting a phase of at least one signal path; and
   a plurality of combiners, each combiner receiving more than one of the plurality of signal paths, at least one combiner receiving a phase adjusted signal path, each combiner generating at least one of the M outputs.

2. The MIMO channel emulator of claim 1, wherein the at least one phase shifter is set to emulate an angle of departure of at least one of the signal paths.

3. The MIMO channel emulator of claim 1, wherein the at least one phase shifter is set to emulate an angle of arrival of at least one of the signal paths.

4. The MIMO channel emulator of claim 1, wherein the at least one phase shifter is manually controlled.

5. The MIMO channel emulator of claim 1, wherein the at least one phase shifter is electronically controlled.

6. The MIMO channel emulator of claim 1, further comprising:
   a plurality of fading emulators, each fading emulator receiving at least one emulator input, the plurality of emulators generating the N splitter inputs.

7. The MIMO channel emulator of claim 6, wherein the fading emulators comprise fading delay lines.

8. The MIMO channel emulator of claim 6, further comprising:
   a plurality of second splitters, each second splitter receiving at least one channel input signal, each second splitter generating a plurality of second signal paths;
   at least one second phase shifter, each second phase shifter adjustably shifting a phase of at least one second signal path; and
   a plurality of second combiners, each second combiner receiving more than one of the plurality of second signal paths, at least one second combiner receiving a phase adjusted second signal path, each second combiner generating at least one of the fading emulator inputs.

9. The MIMO channel emulator of claim 6, wherein the fading emulators are adjusted so that each of the M outputs are not fully correlated with each of the other M outputs.

10. The MIMO channel emulator of claim 1, further comprising:
    a co-channel interference mixing matrix, the co-channel mixing matrix generating a plurality of interference outputs, wherein
    at least one of the combiners receives at least one of the interference outputs.

11. The MIMO channel emulator of claim 10, wherein the co-channel interference mixing matrix comprises:
    a plurality of interference splitters, each interference splitter receiving at least one of a plurality of interference inputs, each interference splitter generating a plurality of multi-path representative interference signals;
    at least one interference phase shifter, each interference phase shifter adjustably shifting a phase of at least one multi-path representative interference signal; and
    a plurality of interference combiners, each interference combiner receiving more than one of the plurality of multi-path representative interference signals, at least one interference combiner receiving a phase adjusted multi-path representative interference signal, each interference combiner generating at least one of the interference outputs.

12. The MIMO channel emulator of claim 1, further comprising:
    a noise generator, the noise generator generating at least one noise output; wherein
    at least one of the combiners receives at least one noise output.

13. A MIMO channel emulator comprising a channel emulator mixing matrix, the channel emulator mixing matrix receiving N inputs and generating M outputs, the channel emulator mixing matrix comprising:
    a plurality of splitters, each splitter receiving at least one of the N inputs, each splitter generating a plurality of signal paths;
    at least one attenuator, each attenuater adjustably attenuating an amplitude of at least one signal path; and
    a plurality of combiners, each combiner receiving more than one of the plurality of signal paths, at least one combiner receiving an amplitude adjusted signal path, each combiner generating at least one of the M outputs.

14. The MIMO channel emulator of claim 13, further comprising:
    a plurality of fading emulators, each fading emulator receiving at least one emulator input, the plurality of emulators generating the N splitter inputs.

15. The MIMO channel emulator of claim 14, further comprising:
- a plurality of second splitters, each second splitter receiving at least one channel input signal, each second splitter generating a plurality of second signal paths;
- at least one second attenuator, each second attenuator adjustably attenuating an amplitude of at least one second signal path; and
- a plurality of second combiners, each second combiner receiving more than one of the plurality of second signal paths, at least one second combiner receiving a phase adjusted second signal path, each second combiner generating at least one of the fading emulator inputs.

16. A method of emulating a transmission channel receiving N inputs and generating M outputs, the method comprising:
- splitting at least one of the N inputs, each split input generating a plurality of signal paths;
- adjustably phase shifting a phase of at least one signal path; and
- combining the plurality of signal paths generating the M outputs, at least one combination including a phase adjusted signal path.

17. The method of emulating a transmission channel of claim 16, wherein adjustably phase shifting a phase of at least one signal path emulates an angle of departure of at least one of the signal paths.

18. The MIMO channel emulator of claim 16, wherein adjustably phase shifting a phase of at least one signal path is adjusted to emulate a correlation between the multi-representative signals.

19. The MIMO channel emulator of claim 16, wherein adjustably phase shifting a phase of at least one signal path is manually controlled.

20. The MIMO channel emulator of claim 16, wherein adjustably phase shifting a phase of at least one signal path is electronically controlled.

21. A MIMO channel emulator comprising a channel emulator mixing matrix, the channel emulator mixing matrix receiving N inputs and generating M outputs, the channel emulator mixing matrix comprising:
- a plurality of splitters, each splitter receiving at least one of the N inputs, each splitter generating a plurality of signal paths;
- at least one phase shifter, each phase shifter adjustably shifting a phase of at least one signal path;
- a plurality of combiners, each combiner receiving more than one of the plurality of signal paths, at least one combiner receiving a phase adjusted signal path, each combiner generating at least one of the M outputs.
- a plurality of fading emulators, each fading emulator receiving at least one emulator input, the plurality of emulators generating the N splitter inputs;
- a plurality of second splitters, each second splitter receiving at least one channel input signal, each second splitter generating a plurality of second signal paths;
- at least one second phase shifter, each second phase shifter adjustably shifting a phase of at least one second signal path; and
- a plurality of second combiners, each second combiner receiving more than one of the plurality of second signal paths, at least one second combiner receiving a phase adjusted second signal path, each second combiner generating at least one of the fading emulator inputs.

* * * * *